United States Patent
Sumi

(10) Patent No.: US 9,013,472 B2
(45) Date of Patent: Apr. 21, 2015

(54) STEREOPHONIC DISPLAY DEVICES

(75) Inventor: Naoki Sumi, Chu-Nan (TW)

(73) Assignee: Innolux Corporation, Jhu-Nan (TW)

( * ) Notice: Subject to any disclaimer, the term of this patent is extended or adjusted under 35 U.S.C. 154(b) by 666 days.

(21) Appl. No.: 13/291,966

(22) Filed: Nov. 8, 2011

(65) Prior Publication Data
US 2013/0113785 A1     May 9, 2013

(51) Int. Cl.
*G06T 15/00*      (2011.01)
*G02B 27/22*      (2006.01)
*H04N 13/04*      (2006.01)

(52) U.S. Cl.
CPC ........ *G02B 27/2214* (2013.01); *H04N 13/0409* (2013.01)

(58) Field of Classification Search
None
See application file for complete search history.

(56) References Cited

U.S. PATENT DOCUMENTS

2005/0225502 A1* 10/2005 Nam et al. ................. 345/55
2007/0211216 A1* 9/2007 Saishu et al. ............... 353/7

FOREIGN PATENT DOCUMENTS

| JP | 2003-158752 | 5/2003 |
| JP | 2003-523532 | 8/2003 |
| JP | 2006-098779 | 4/2006 |
| JP | 2007-249398 | 9/2007 |
| JP | 2008-228199 | 9/2008 |
| JP | 2011-217180 | 10/2011 |
| TW | 200941039 | 10/2009 |

* cited by examiner

*Primary Examiner* — Christopher S Kelley
*Assistant Examiner* — Kaitlin A Retallick
(74) *Attorney, Agent, or Firm* — Liu & Liu

(57) ABSTRACT

In one embodiment of the invention, a stereophonic display device is provided. The stereophonic display device includes a pixel unit including a plurality of subpixels, wherein the subpixels include at least two right eye subpixels and two left eye subpixels, a barrier with a plurality of apertures formed on the pixel unit, wherein the smallest distance between the locations of the apertures projected onto the pixel unit and boundaries of the pixel unit is equal to or greater than a quarter of the width of the pixel unit, and a display image processor controlling the pixel unit rendering of the right eye subpixel block and the left eye subpixel block sequentially.

8 Claims, 6 Drawing Sheets

STEREOPHONIC DISPLAY DEVICES

BACKGROUND OF THE INVENTION

1. Field of the Invention

The invention relates to a stereophonic display device, and in particular to a thicker stereophonic display device capable of reducing the stereophonic X-talk issue and stereophonic moiré.

2. Description of the Related Art

Recently, high-resolution displays, like 330 ppi (pixels per inch) displays, are being implemented for HD movies and/or web site information on mobile phones.

Therefore, design of the thickness or thinness of stereophonic displays (auto-stereoscopic type barrier/lenticular stereophonic displays) has become a critical issue. For example, a thinner lens sheet and/or a thinner glass plate are necessary for displays. However, the difficulty of fabricating thinner sheets and plates may affect production yield due to process limitations and critical process issues for mass production, such as an increase in bending or cracking.

BRIEF SUMMARY OF THE INVENTION

One embodiment of the invention provides a stereophonic display device, comprising: a pixel unit comprising a plurality of subpixels, wherein the subpixels comprise at least two right eye subpixels and two left eye subpixels; a barrier with a plurality of apertures formed on the pixel unit, wherein the smallest distance between the locations of the apertures projected onto the pixel unit and boundaries of the pixel unit is equal to or greater than a quarter of the width of the pixel unit; and a display image processor controlling the pixel unit rendering of the right eye subpixel block and the left eye subpixel block sequentially.

One embodiment of the invention provides a stereophonic display device, comprising: a pixel unit comprising a plurality of subpixels, wherein the subpixels comprise at least two right eye subpixels and two left eye subpixels; a plurality of lenses formed on the pixel unit, wherein the smallest distance between the locations of the apexes of the lenses projected onto the pixel unit and boundaries of the pixel unit is greater than a quarter of the width of the pixel unit; and a display image processor controlling the pixel unit rendering of the right eye subpixel block and the left eye subpixel block sequentially.

In the present invention, an increased thickness (optical distance in air) between a pixel and a barrier or lens is designed. The thickness (optical distance in air) between the pixel and the barrier or the apexes of the lenses is proportional to the number of subpixels. Fabrication of such thicker devices is easier than that of thinner ones and the critical process issues (such as bending or cracking) for mass production of conventional high-ppi (pixels per inch) stereophonic display devices can thus be prevented, facilitating the mass production of devices.

Additionally, the locations of the apertures of the barrier or the apexes of the lenses are altered, resulting in alternation of subpixel rendering from "RLRL" to "RRLL" or from "RLR-LRL" to "RRRLLL" (R represents a right-eye subpixel; L represents a left-eye subpixel) in a horizontal direction, achieving a wider margin for solving the stereophonic X-talk issue, a wider stereophonic viewing space and a brighter image and reducing affects from the stereophonic moiré issue simultaneously. Specifically, when two or more apertures are combined into one aperture, the original fringe lens effect caused by a barrier electrode pattern edge can thus be reduced due to decreased edge numbers thereof, apparently facilitating the lowering of the stereophonic X-talk issue.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

Figure 1:
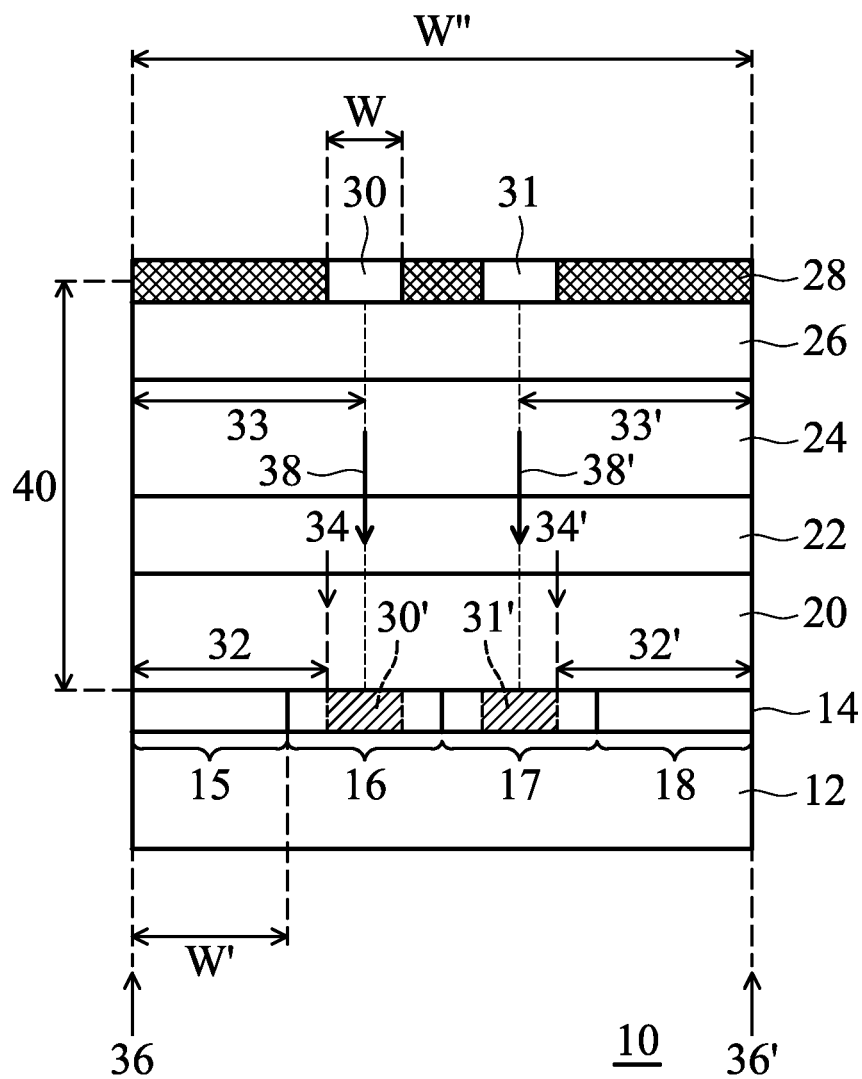
FIG. 1 shows a cross-section view of a stereophonic display device according to an embodiment of the invention.
Figure 2:
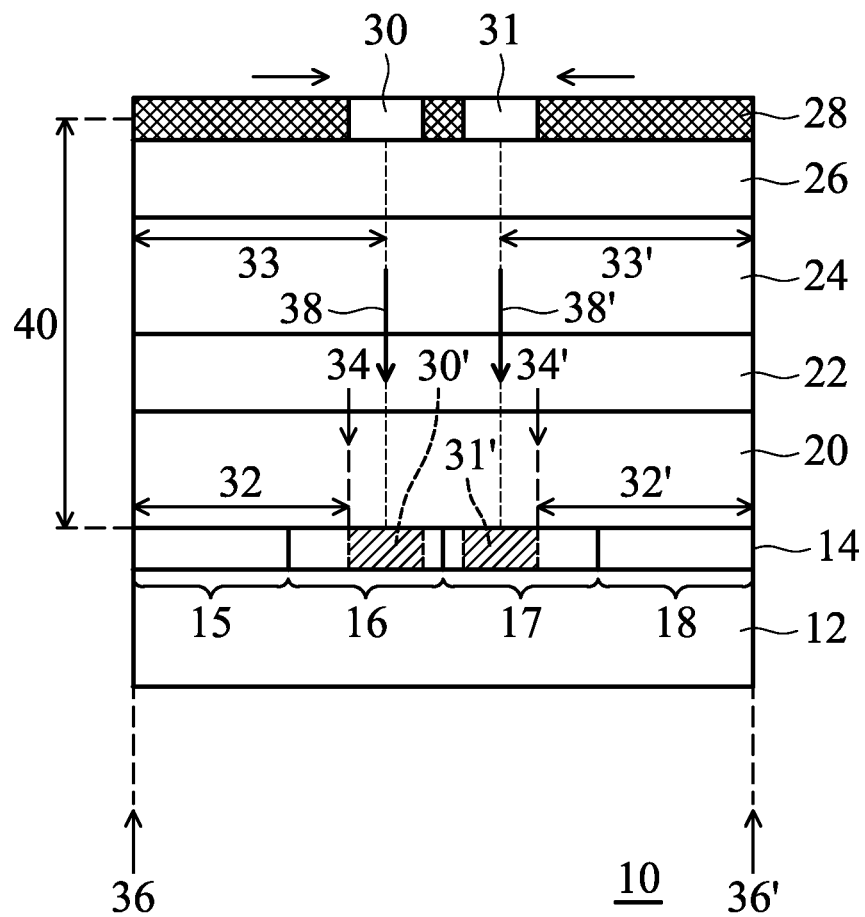
FIG. 2 shows a cross-section view of a stereophonic display device according to an embodiment of the invention.
Figure 3:
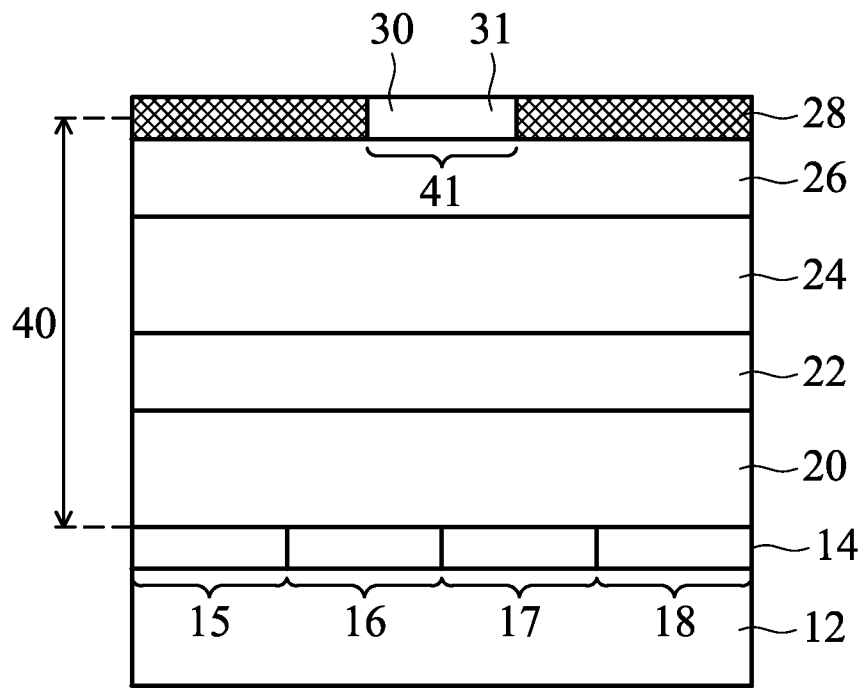
FIG. 3 shows a cross-section view of a stereophonic display device according to an embodiment of the invention.

According to one embodiment of the invention, referring to FIG. 1, a stereophonic display device is provided. The stereophonic display device 10 comprises a TFT substrate 12, a pixel unit 14 formed on the TFT substrate 12, a color filter 20 formed on the pixel unit 14, a polarizer 22 formed on the color filter 20, a glue 24, for example a pressure sensitive adhesive (PSA), coated on the polarizer 22, a transparent material layer 26, for example a PET layer, adhered to the polarizer 22 through the glue 24, and a barrier 28 with a first aperture 30 and a second aperture 31 formed on the transparent material layer 26. The pixel unit 14 comprises a first subpixel 15, a second subpixel 16, a third subpixel 17 and a fourth subpixel 18. The first subpixel 15 and the second subpixel 16 are divided for the right eye. The third subpixel 17 and the fourth subpixel 18 are divided for the left eye. The first aperture 30 and the second aperture 31 are separated into two slit patterns. A width W of one aperture (30 or 31) accounts for about 60% of a width W' of one subpixel (15, 16, 17 or 18). Thus, in this embodiment, the width W of one aperture (30 or 31) accounts for about 15% (60%×¼ (the pixel unit 14 comprising four subpixels (15, 16, 17 and 18))) of a width W" of the barrier 28. Specifically, a distance between a location 30' of the first aperture 30 projected onto the pixel unit 14 and a first boundary 36 of the pixel unit 14 is equal to or greater than a quarter (¼) of the width of the pixel unit 14. Similarly, a distance between a location 31' of the second aperture 31 projected onto the pixel unit 14 and a second boundary 36' of the pixel unit 14 is equal to or greater than a quarter (¼) of the width of the pixel unit 14. For example, a distance 32 between an edge 34 of the location 30' of the first aperture 30 projected onto the pixel unit 14 and the first boundary 36 of the pixel unit 14 is five-sixteenths (5/16) of the width of the pixel unit 14 or a distance 32' between an edge 34' of the location 31' of the second aperture 31 projected onto the pixel unit 14 and the second boundary 36' of the pixel unit 14 is five-sixteenths (5/16) of the width of the pixel unit 14. For example, a distance 33 between a center 38 of the location 30' of the first aperture 30 projected onto the pixel unit 14 and the first boundary 36 of the pixel unit 14 is three-eighths (3/8) of the width of the pixel unit 14 or a distance 33' between a center 38' of the location 31' of the second aperture 31 projected onto the pixel unit 14 and the second boundary 36' of the pixel unit 14 is three-eighths (⅜) of the width of the pixel unit 14. The first aperture 30 and the second aperture 31 may be closer to each other, as shown in FIG. 2, for example, the distance 32 between the edge 34 of the location 30' of the first aperture 30 projected onto the pixel unit 14 and the first boundary 36 of the pixel unit 14 is greater than five-sixteenths (⁵⁄₁₆) the width of the pixel unit 14 or the distance 32' between the edge 34' of the location 31' of the second aperture 31 projected onto the pixel unit 14 and the second boundary 36' of the pixel unit 14 is greater than five-sixteenths (⁵⁄₁₆) the width of the pixel unit 14, and for example, the distance 33 between the center 38 of the location 30' of the first aperture 30 projected onto the pixel unit 14 and the first boundary 36 of the pixel unit 14 is greater than three-eighths (⅜) of the width of the pixel unit 14 or the distance 33' between the center 38' of the location 31' of the second aperture 31 projected onto the pixel unit 14 and the second boundary 36' of the pixel unit 14 is greater than three-eighths (⅜) of the width of the pixel unit 14. The first aperture 30 and the second aperture 31 may be further combined to form a combined aperture 41, as shown in FIG. 3. In FIGS. 1-3, an optical distance 40 in air between the pixel unit 14 and the barrier 28 is proportional to the number of subpixels. Additionally, the ratio (K) of the double of the optical distance 40 in air between the pixel unit 14 and the barrier 28 and the width W' of one subpixel may be greater than 9 and smaller than 15, for example K=9.5. Additionally, the stereophonic display device 10 further comprises a display image processor (not shown) controlling the pixel unit rendering of the right eye subpixel block and the left eye subpixel block sequentially.

Figure 4:
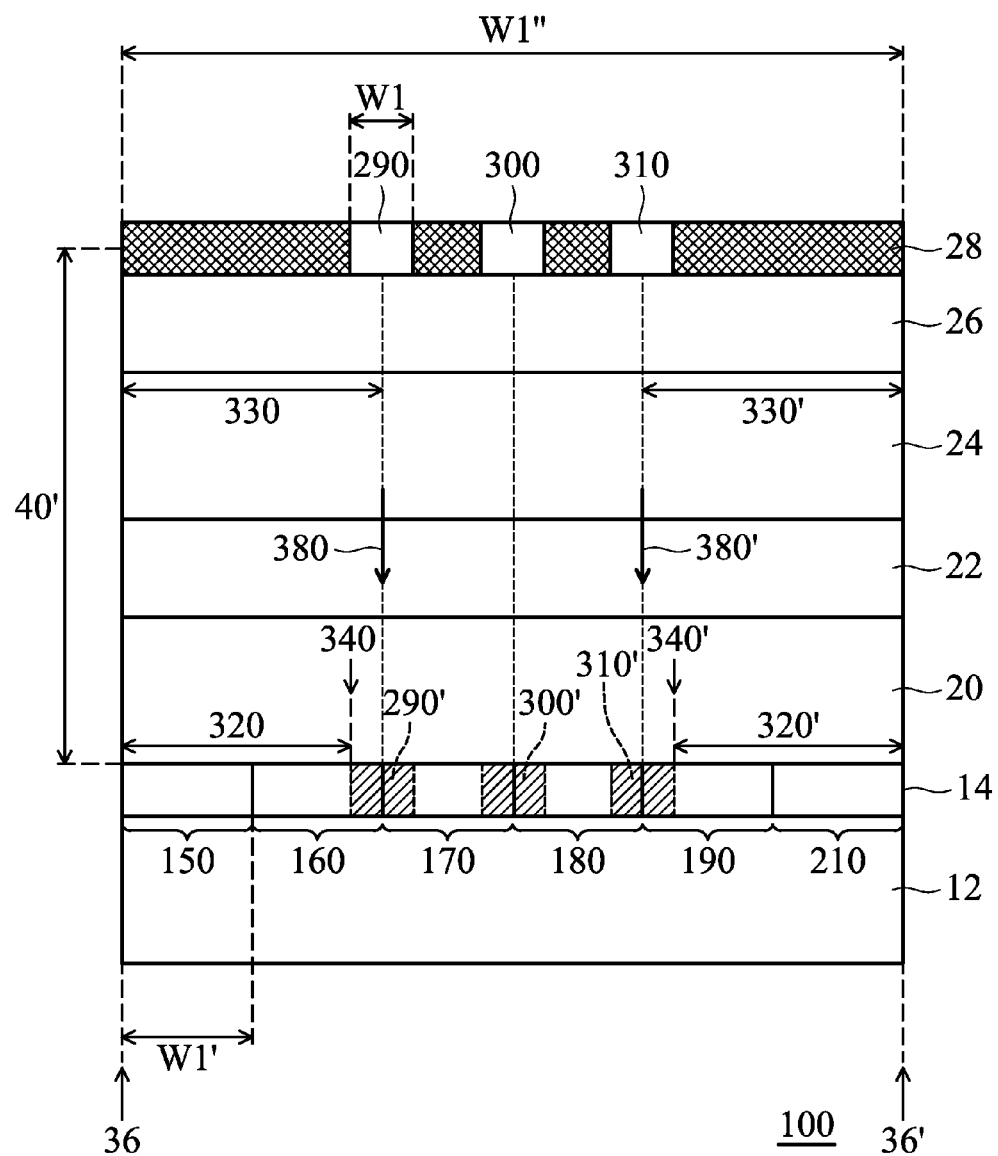
FIG. 4 shows a cross-section view of a stereophonic display device according to an embodiment of the invention.

According to one embodiment of the invention, referring to FIG. 4, a stereophonic display device is provided. The stereophonic display device 100 comprises a TFT substrate 12, a pixel unit 14 formed on the TFT substrate 12, a color filter 20 formed on the pixel unit 14, a polarizer 22 formed on the color filter 20, a glue 24, for example a pressure sensitive adhesive (PSA), coated on the polarizer 22, a transparent material layer 26, for example a PET layer, adhered to the polarizer 22 through the glue 24, and a barrier 28 with a first aperture 290, a second aperture 300 and a third aperture 310 formed on the transparent material layer 26. The pixel unit 14 comprises a first subpixel 150, a second subpixel 160, a third subpixel 170, a fourth subpixel 180, a fifth subpixel 190 and a sixth subpixel 210. The first subpixel 150, the second subpixel 160 and the third subpixel 170 are divided for the right eye. The fourth subpixel 180, the fifth subpixel 190 and the sixth subpixel 210 are divided for the left eye. The first aperture 290, the second aperture 300 and the third aperture 310 are separated into three slit patterns. A width W1 of one aperture (290, 300 or 310) accounts for about 60% of a width W1' of one subpixel (150, 160, 170, 180, 190 or 210). Thus, in this embodiment, the width W1 of one aperture (290, 300 or 310) accounts for about 10% (60%×⅙ (the pixel unit 14 comprising six subpixels (150, 160, 170, 180, 190 and 210))) of a width W1" of the barrier 28. Specifically, a distance between a location 290' of the first aperture 290 projected onto the pixel unit 14 and a first boundary 36 of the pixel unit 14 is equal to or greater than a quarter (¼) of the width of the pixel unit 14. Similarly, a distance between a location 310' of the third aperture 310 projected onto the pixel unit 14 and a second boundary 36' of the pixel unit 14 is equal to or greater than a quarter (¼) of the width of the pixel unit 14. For example, a distance 320 between an edge 340 of the location 290' of the first aperture 290 projected onto the pixel unit 14 and the first boundary 36 of the pixel unit 14 is seventeen-sixtieths (¹⁷⁄₆₀) of the width of the pixel unit 14 or a distance 320' between an edge 340' of the location 310' of the third aperture 310 projected onto the pixel unit 14 and the second boundary 36' of the pixel unit 14 is seventeen-sixtieths (¹⁷⁄₆₀) of the width of the pixel unit 14. For example, a distance 330 between a center 380 of the location 290' of the first aperture 290 projected onto the pixel unit 14 and the first boundary 36 of the pixel unit 14 is one-third (⅓) of the width of the pixel unit 14 or a distance 330' between a center 380' of the location 310' of the third aperture 310 projected onto the pixel unit 14 and the second boundary 36' of the pixel unit 14 is one-third (⅓) of the width of the pixel unit 14. The first aperture 290, the second aperture 300 and the third aperture 310 may also be closer to each other, for example, the distance 320 between the edge 340 of the location 290' of the first aperture 290 projected onto the pixel unit 14 and the first boundary 36 of the pixel unit 14 is greater than seven twenty-fourths (⁷⁄₂₄) of the width of the pixel unit 14 (not shown) or the distance 320' between the edge 340' of the location 310' of the third aperture 310 projected onto the pixel unit 14 and the second boundary 36' of the pixel unit 14 is greater than seven twenty-fourths (⁷⁄₂₄) of the width of the pixel unit 14 (not shown), and for example, the distance 330 between the center 380 of the location 290' of the first aperture 290 projected onto the pixel unit 14 and the first boundary 36 of the pixel unit 14 is greater than one-third (⅓) of the width of the pixel unit 14 (not shown) or the distance 330' between the center 380' of the location 310' of the third aperture 310 projected onto the pixel unit 14 and the second boundary 36' of the pixel unit 14 is greater than one-third (⅓) of the width of the pixel unit 14 (not shown). The first aperture 290, the second aperture 300 and the third aperture 310 may also be further combined to form a combined aperture (not shown). Specifically, an optical distance 40' in air between the pixel unit 14 and the barrier 28 is proportional to the number of subpixels. In this embodiment, the ratio (K') of the triple of the optical distance 40' in air between the pixel unit 14 and the barrier 28 and the width W1' of one subpixel may be greater than 13.5 and smaller than 22.5, for example K'=14.3. Additionally, the stereophonic display device 100 further comprises a display image processor (not shown) controlling the pixel unit rendering of the right eye subpixel block and the left eye subpixel block sequentially.

Figure 5:
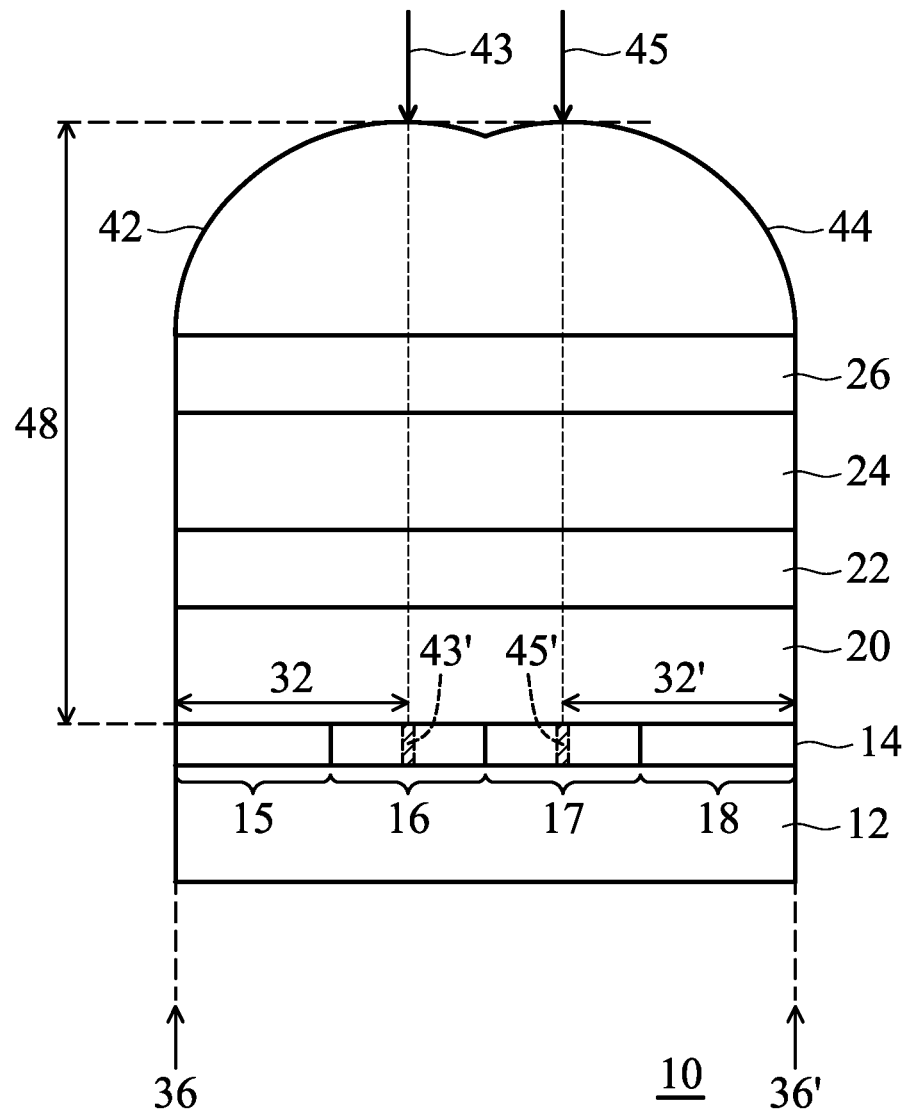
FIG. 5 shows a cross-section view of a stereophonic display device according to an embodiment of the invention.
Figure 6:
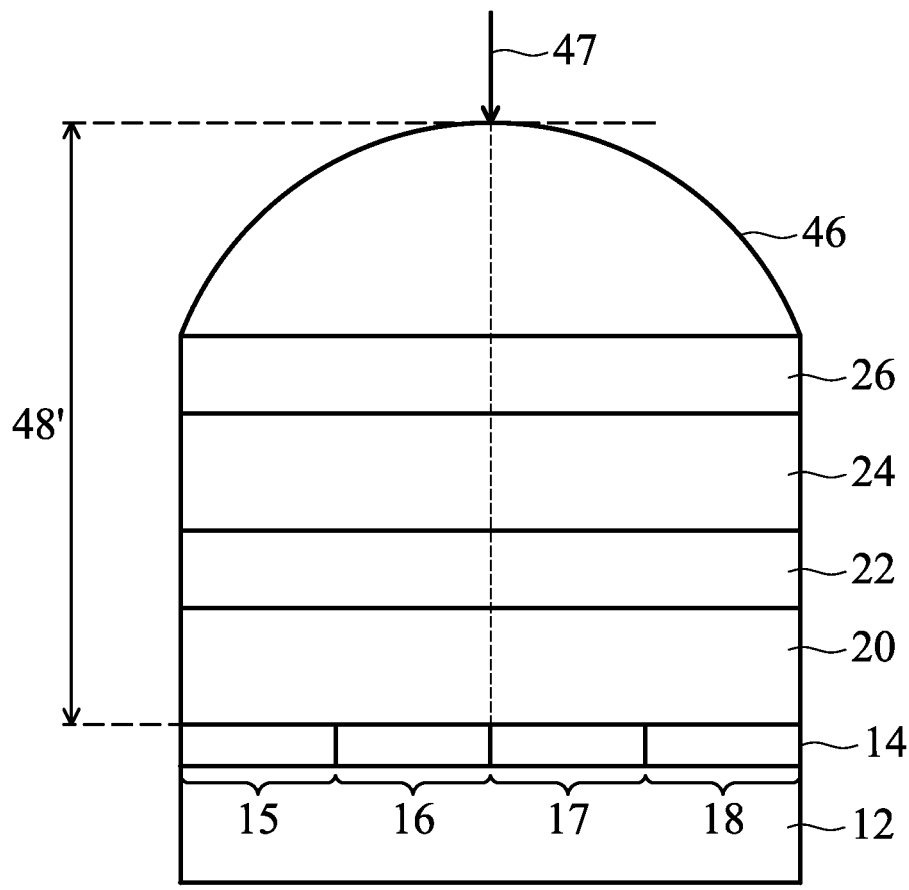
FIG. 6 shows a cross-section view of a stereophonic display device according to an embodiment of the invention.

According to one embodiment of the invention, referring to FIG. 5, a stereophonic display device is provided. The stereophonic display device 10 comprises a TFT substrate 12, a pixel unit 14 formed on the TFT substrate 12, a color filter 20 formed on the pixel unit 14, a polarizer 22 formed on the color filter 20, a glue 24, for example a pressure sensitive adhesive (PSA), coated on the polarizer 22, a transparent material layer 26, for example a PET layer, adhered to the polarizer 22 through the glue 24, and a first lens 42 with an apex 43 and a second lens 44 with an apex 45 formed on the transparent material layer 26. The pixel unit 14 comprises a first subpixel 15, a second subpixel 16, a third subpixel 17 and a fourth subpixel 18. The first subpixel 15 and the second subpixel 16 are divided for the right eye. The third subpixel 17 and the fourth subpixel 18 are divided for the left eye. The first lens 42 and the second lens 44 are separated into two cylindrical lenses. Specifically, a distance between a location 43' of the apex 43 of the first lens 42 projected onto the pixel unit 14 and a first boundary 36 of the pixel unit 14 is greater than a quarter (¼) of the width of the pixel unit 14. Similarly, a distance between a location 45' of the apex 45 of the second lens 44 projected onto the pixel unit 14 and a second boundary 36' of the pixel unit 14 is greater than a quarter (¼) of the width of the pixel unit 14. For example, a distance 32 between the location 43' of the apex 43 of the first lens 42 projected onto the pixel unit 14 and the first boundary 36 of the pixel unit 14 is three-eighths (⅜) of the width of the pixel unit 14 or a distance 32' between the location 45' of the apex 45 of the second lens 44 projected onto the pixel unit 14 and the second boundary 36' of the pixel unit 14 is three-eighths (3/8) of the width of the pixel unit 14. The first lens 42 and the second lens 44 may be closer to each other, for example, the distance 32 between the location 43' of the apex 43 of the first lens 42 projected onto the pixel unit 14 and the first boundary 36 of the pixel unit 14 is greater than three-eighths (3/8) of the width of the pixel unit 14 (not shown) or the distance 32' between the location 45' of the apex 45 of the second lens 44 projected onto the pixel unit 14 and the second boundary 36' of the pixel unit 14 is greater than three-eighths (3/8) of the width of the pixel unit 14 (not shown). The first lens 42 and the second lens 44 may be further combined to form a combined lens 46 with an apex 47, as shown in FIG. 6. Additionally, the ratio (K) of a double of an optical distance 48 in air between the pixel unit 14 and the apexes (43 and 45) of the first and second lenses (42 and 44) and the width of one subpixel may be greater than 9 and smaller than 15, for example K=9.5, as shown in FIG. 5. The ratio (K') of a triple of an optical distance 48' in air between the pixel unit 14 and the apex 47 of the combined lens 46 and the width of one subpixel may be greater than 13.5 and smaller than 22.5, for example K'=14.3, as shown in FIG. 6. Additionally, similar to the present barrier-type stereophonic display devices, in the present lens-type stereophonic display devices, the optical distance in air between the pixel unit and the apexes of the lenses is proportional to the number of subpixels. Additionally, the stereophonic display device 10 further comprises a display image processor (not shown) controlling the pixel unit rendering of the right eye subpixel block and the left eye subpixel block sequentially.

In the present invention, an increased thickness (optical distance in air) between a pixel and a barrier or lens is designed. The thickness (optical distance in air) between the pixel and the barrier or the apexes of the lenses is proportional to the number of subpixels. Fabrication of such thicker devices is easier than that of thinner ones and the critical process issues (such as bending or cracking) for mass production of conventional high-ppi (pixels per inch) stereophonic display devices can thus be prevented, facilitating the mass production of devices.

Additionally, the locations of the apertures of the barrier or the apexes of the lenses are altered, resulting in alternation of subpixel rendering from "RLRL" to "RRLL" or from "RLRLRL" to "RRRLLL" (R represents a right-eye subpixel; L represents a left-eye subpixel) in a horizontal direction, achieving a wider margin for solving the stereophonic X-talk issue, a wider stereophonic viewing space and a brighter image and reducing affects from the stereophonic moiré issue simultaneously. Specifically, when two or more apertures are combined into one aperture, the original fringe lens effect caused by a barrier electrode pattern edge can thus be reduced due to decreased edge numbers thereof, apparently facilitating the lowering of the stereophonic X-talk issue.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stereophonic display device, comprising:
a pixel unit comprising a plurality of subpixels, wherein the subpixels comprise at least two right eye subpixels and two left eye subpixels;
a barrier with a plurality of apertures formed on the pixel unit, wherein the smallest distance between the locations of the apertures projected onto the pixel unit and boundaries of the pixel unit is equal to or greater than a quarter of the width of the pixel unit, and wherein an optical distance in air between the pixel unit and the barrier is proportional to the number of subpixels; and
a display image processor controlling the pixel unit rendering of a right eye subpixel block and a left eye subpixel block sequentially.

2. The stereophonic display device as claimed in claim 1, wherein the apertures are separated into at least two slit patterns.

3. The stereophonic display device as claimed in claim 1, wherein the apertures are combined.

4. The stereophonic display device as claimed in claim 1, wherein an optical distance in air between the pixel unit and the barrier and a width of one subpixel have a ratio of K, wherein K is greater than 9 and smaller than 15.

5. A stereophonic display device, comprising:
a pixel unit comprising a plurality of subpixels, wherein the subpixels comprise at least two right eye subpixels and two left eye subpixels;
a plurality of lenses formed on the pixel unit, wherein the smallest distance between the locations of the apexes of the lenses projected onto the pixel unit and boundaries of the pixel unit is greater than a quarter of the width of the pixel unit, and wherein an optical distance in air between the pixel unit and the apexes of the lenses is proportional to the number of subpixels; and
a display image processor controlling the pixel unit rendering of a right eye subpixel block and a left eye subpixel block sequentially.

6. The stereophonic display device as claimed in claim 5, wherein the lenses are separated into at least two cylindrical lenses.

7. The stereophonic display device as claimed in claim 5, wherein the lenses are combined.

8. The stereophonic display device as claimed in claim 7, wherein an optical distance in air between the pixel unit and the apexes of the lenses and a width of one subpixel have a ratio of K, wherein K is greater than 9 and smaller than 15.

* * * * *